(12) United States Patent
Lutz

(10) Patent No.: US 7,401,550 B2
(45) Date of Patent: Jul. 22, 2008

(54) LASER-ASSISTED REPLICATION METHOD

(75) Inventor: Norbert Lutz, Rückersdorf (DE)

(73) Assignee: Leonhard Kurz GmbH & Co. KG, Furth (DE)

( * ) Notice: Subject to any disclaimer, the term of this patent is extended or adjusted under 35 U.S.C. 154(b) by 361 days.

(21) Appl. No.: 10/524,223

(22) PCT Filed: Aug. 5, 2003

(86) PCT No.: PCT/DE03/02619

§ 371 (c)(1),
(2), (4) Date: Feb. 9, 2005

(87) PCT Pub. No.: WO2004/020175

PCT Pub. Date: Mar. 11, 2004

(65) Prior Publication Data

US 2005/0257700 A1    Nov. 24, 2005

(30) Foreign Application Priority Data

Aug. 9, 2002    (DE) ................................. 102 36 597

(51) Int. Cl.
  *B44B 5/00* (2006.01)
(52) U.S. Cl. ............................ 101/27; 101/3.1; 101/31; 101/32; 264/1.31; 264/319; 264/402
(58) Field of Classification Search .................. None
  See application file for complete search history.

(56) References Cited

U.S. PATENT DOCUMENTS

| 3,758,649 | A | * | 9/1973 | Frattarola | .................. 264/1.33 |
| 4,223,050 | A | | 9/1980 | Nyfeler et al. | |
| 4,547,141 | A | * | 10/1985 | Ruschmann | ................ 425/374 |
| 5,109,767 | A | | 5/1992 | Nyfeler et al. | |

(Continued)

FOREIGN PATENT DOCUMENTS

| CH | 594 495 | 1/1978 |
| DE | 25 55 214 A1 | 6/1977 |
| DE | 198 01 346 C1 | 2/1999 |
| EP | 0 169 326 A1 | 1/1986 |
| EP | 0 419 773 B1 | 4/1991 |
| EP | 0 896 259 A2 | 2/1999 |

*Primary Examiner*—Jill E. Culler
(74) *Attorney, Agent, or Firm*—Hoffmann & Baron, LLP

(57) ABSTRACT

The invention concerns an apparatus and a process for producing a marking on a substrate. Substrates marked in that way are applied to documents such as for example credit cards, personal identity cards or banknotes as security features to provide protection from forgery. Embodiments of those security features have diffractive or holographic structures. The production of the markings was hitherto effected by shaping from a mold. A change in the marking is possible by changing the mole, which is time-consuming. The new apparatus and the new process are intended to permit the production of individualized markings on a substrate, at a low level of apparatus expenditure.

An embodiment of the apparatus according to the invention for producing a marking on a substrate, preferably a film, has a replication apparatus and a laser installation, which cooperates with the replication apparatus, by radiation from the laser installation being directed onto at least one irradiation region of the replication apparatus, for producing at least one shaping region. The apparatus further has a counterpressure apparatus, wherein a substrate is arranged between the replication apparatus and the counterpressure apparatus in order to shape the shaping region onto the substrate in a contact region between the replication apparatus and the substrate and wherein the feed of the radiation for producing the shaping regions extends outside the substrate.

38 Claims, 9 Drawing Sheets

U.S. PATENT DOCUMENTS

| | | | |
|---|---|---|---|
| 5,115,737 A * | 5/1992 | Amendola | 101/32 |
| 5,771,796 A * | 6/1998 | Morrison et al. | 101/22 |
| 5,858,298 A | 1/1999 | Humal | |
| 5,979,308 A * | 11/1999 | Kagi et al. | 101/27 |
| 6,227,109 B1 * | 5/2001 | Inoue et al. | 101/177 |
| 2003/0131740 A1 * | 7/2003 | Butsch et al. | 101/32 |

* cited by examiner

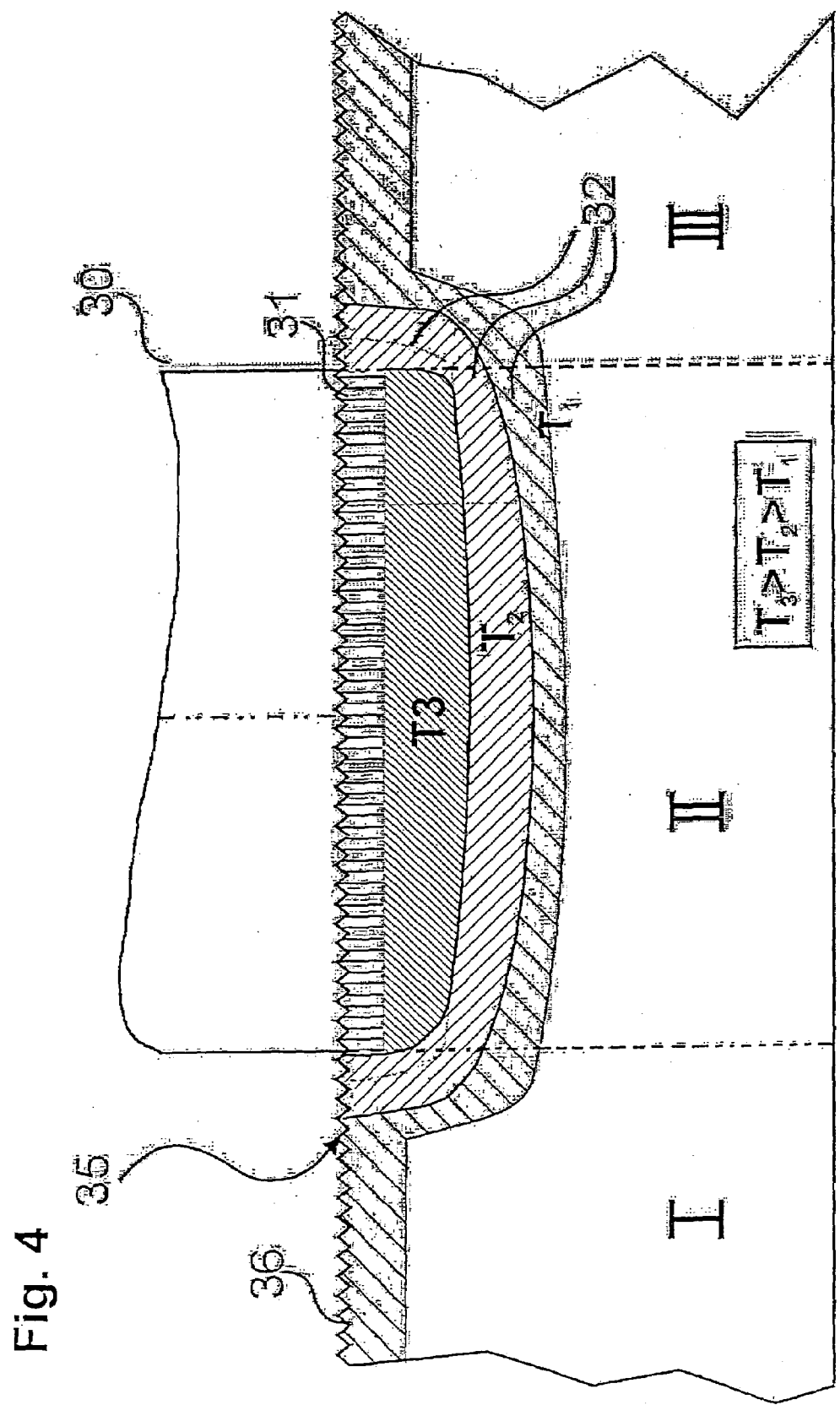

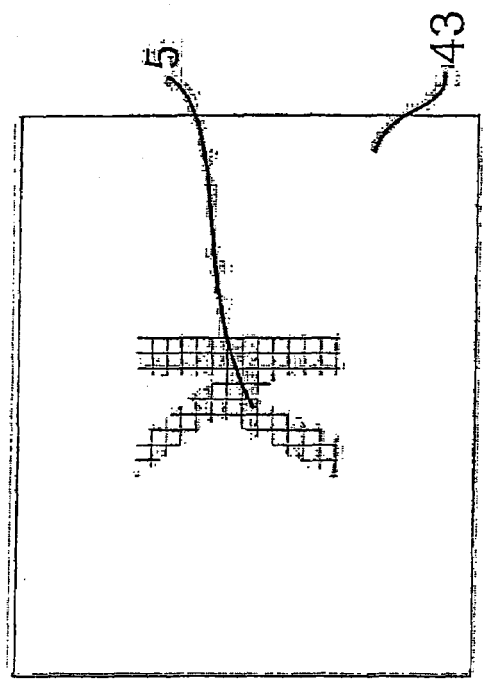
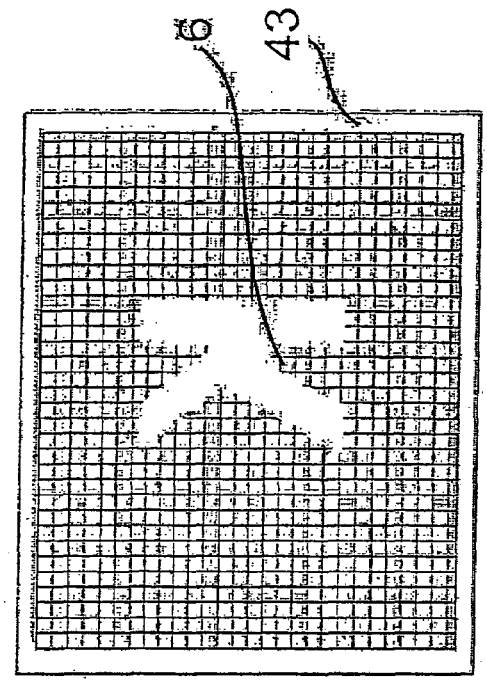
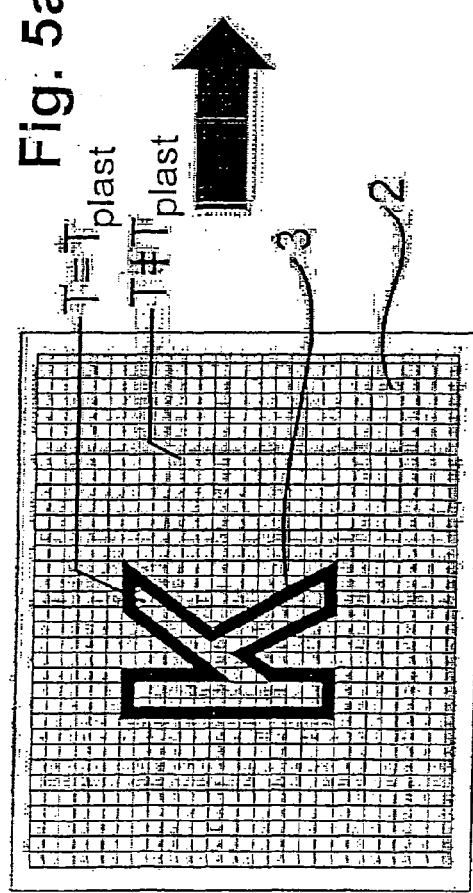
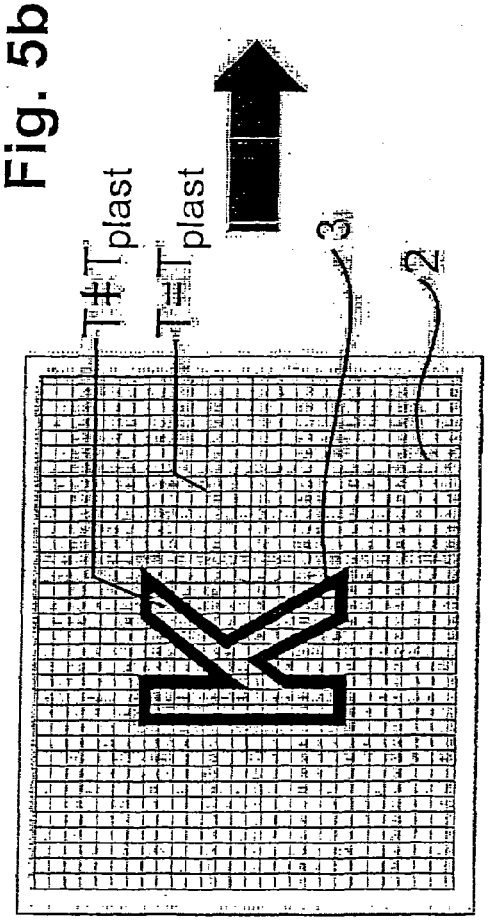
Fig. 5a
Fig. 5b

Fig. 6
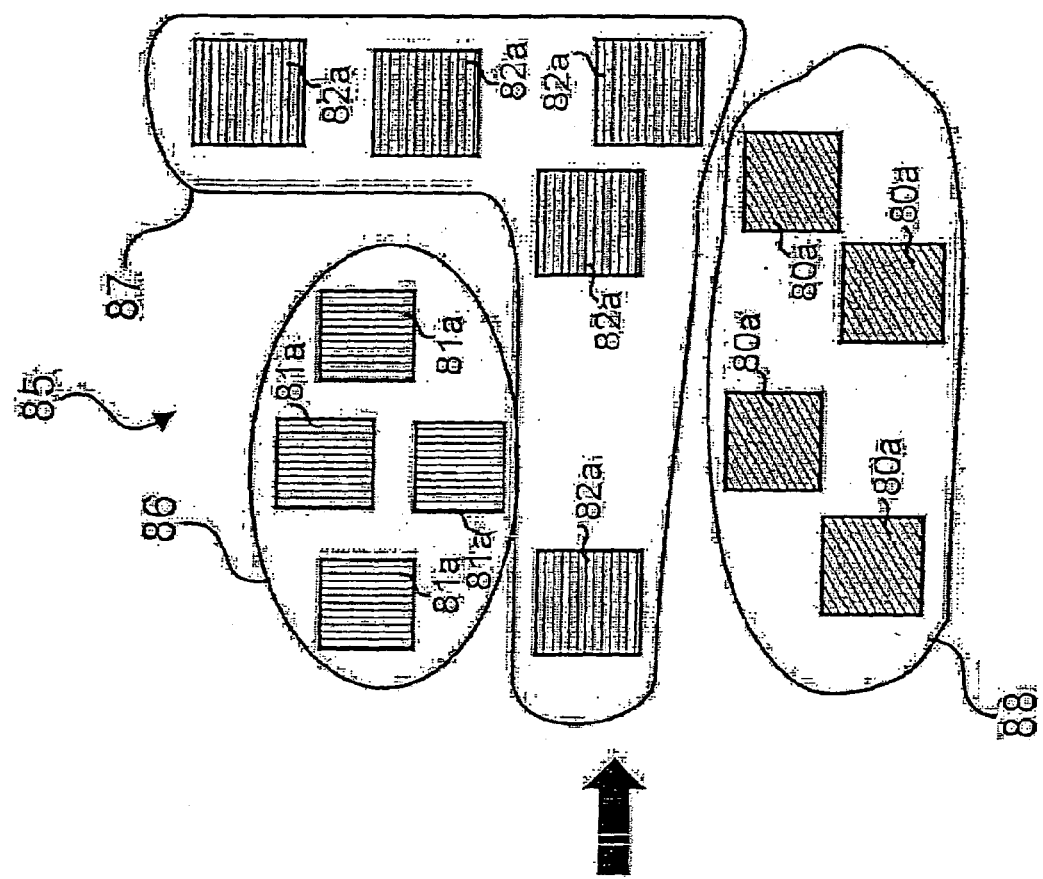
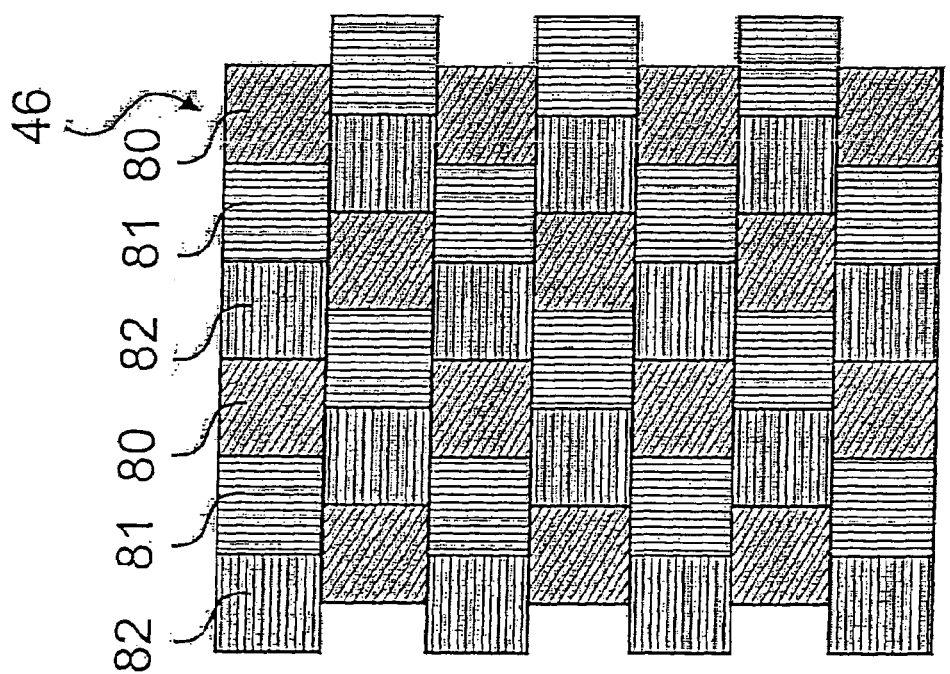

LASER-ASSISTED REPLICATION METHOD

CROSS-REFERENCE TO RELATED APPLICATIONS

This application is a National Phase application of International Application No. PCT/DE2003/002619 filed Aug. 5, 2003, which claims priority based on German Patent Application No. 10236597.0, filed Aug. 9, 2002, which are incorporated herein by reference.

BACKGROUND OF THE INVENTION

The invention concerns an apparatus for producing a marking on a substrate, preferably a film, in particular a transfer film, comprising a replication apparatus having a replication surface, and a device for producing radiation, preferably a laser installation, which co-operates with the replication apparatus, by the radiation being directed onto at least one irradiation region of the replication apparatus for producing at least one shaping region, and a counterpressure apparatus, wherein a substrate is arranged between the replication apparatus and the counterpressure apparatus in order to shape the shaping region onto the substrate in a contact region between the replication apparatus and the substrate, and a process for producing a marking on a substrate, preferably a film, in particular a transfer film, wherein energy in the form of radiation, preferably laser radiation, from a device producing radiation is used for producing at least one shaping region on a replication surface of a replication apparatus, and wherein the shaping region of the replication surface is shaped onto the substrate by the replication apparatus contacting the substrate under pressure.

The protection of documents by security features has become a standard in the meantime, in the case for example of credit cards, personal identity cards or banknotes. The forgery-proof character of those features is based on the fact that a high degree of special knowledge and extensive apparatus equipment is necessary for the production thereof. A particularly successful security feature which is difficult to copy is an OVD (optical variable device). Embodiments of that security feature have diffractive or holographic structures which, upon a change in the angle of the incidence of light or the viewing angle during visual checking of the authenticity of the security feature, lead to an optical effect such as for example a color change, a motif change or a combination of the two. The security feature can thus be checked in respect of its authenticity without further technical aids. An essential component part of those security elements is a generally thermoplastic or UV-hardenable layer into which the diffractive or holographic structure is embossed in the form of a surface relief. That layer can be part of a transfer film, in which case the security element is firstly produced and thereafter transferred onto the document to be safeguarded. That layer can also be produced in the form of an additional layer directly on the article to be safeguarded. The operation of transferring the surface relief from a mold onto the thermoplastic layer is effected by using rotating stamping cylinders as are described for example in EP 0 419 773 or stamping punches as are disclosed for example in DE 2 555 214. By virtue of the fine diffractive or holographic structures production of the mold is technically very demanding and also cost-intensive. For producing the molds firstly patterns, also referred to as masters, are produced for example by interfering laser beams and etching processes or by electron beam writing, and they are then generally galvanically shaped.

In the case of the known processes, for an enhanced forgery-proof nature, the endeavour is that the same security feature is not applied to each document, but the security features are adapted to the respective document or the identity of the owner of the document, that is to say they are individualized. In that respect two difficulties arise with the above-mentioned processes:

On the one hand a large number of individualized masters would have to be produced, which is very cost-intensive, and secondly the molds would have to be respectively interchanged in the replication apparatuses, and this would result in very long equipment preparation times.

As alternatives, processes and apparatuses are known which shape only partial regions of a mold in order to produce individualized security features.

CH 594 495 describes a process for stamping a relief pattern in a thermoplastic information carrier, wherein selectively only partial regions of the mold are shaped into the thermoplastic layer. In terms of process engineering, those shaping regions are selected by a procedure whereby either those regions are heated by heating bands through which current flows or only selected shaping regions are pressed onto the substrate by a counterpressure device which has partial regions which are adjustable in respect of height. A high level of local resolution in selection of the shaping regions is not to be expected with that process as heat conduction during the long heating-up and cooling-down phase for the heating bands means that the boundaries of the shaping regions can be only inaccurately defined or the dimensions of the shaping regions are established by the dimensions of the bands or the dimensions of the partial regions which are adjustable in respect of height. That process is consequently limited by virtue of having a low level of local resolution.

EP 0 169 326 describes an apparatus for producing a marking on a substrate and the process corresponding thereto. The apparatus has a replication apparatus in the form of an unheated stamping mold and a pressure plate which is in the form of a counterpressure apparatus. The stamping mold has a replication surface which is structured with microstructures which are to be shaped. The apparatus has a laser arrangement for producing a laser beam which is directed onto the substrate through the counterpressure device. The known process provides that firstly the substrate is pressed onto the pressure plate by the stamping punch. Absorption of the laser beam which is incident on the substrate directly in the stamping region and absorption of the radiation reflected at the replication surface of the stamping punch provide that the substrate is selectively locally heated and raised to a temperature at which it can be permanently deformed. In that way shaping regions can be selected and transferred selectively by positioning of the laser beam. A limitation in that process and apparatus is that the laser beam is guided through the substrate. That means that the process is limited to processing substrates which are transparent for the laser radiation and in addition it is highly sensitive to fluctuations in the absorption properties of the substrate, which can occur for example due to fluctuations in material, in dependence on the batch involved.

The object of the invention is to provide an apparatus and a process which permit the production of individualized markings on a substrate, preferably a film, at a low level of apparatus expenditure.

That object is attained by the apparatus set forth in claim 1 and the process set forth in claim 15.

SUMMARY OF THE INVENTION

The apparatus according to the invention serves for applying or producing a marking on a substrate. The marking has a preferably diffractively or holographically effective surface structuring or a preferably diffusely or directedly scattering matt structure which is applied by means of replication processes to a thermoplastic layer of a substrate, in particular of a body. The marking can be in the form of a figure, digit, character, surface pattern, surface image, text, numbering, security feature or of any other form.

The apparatus has a replication apparatus which can be of a roller nature or in the form of a stamping punch. The replication apparatus has a replication surface which comes into contact with the substrate in a contact region in the co-operation of the replication apparatus and the substrate.

Shaping regions can be produced on the replication surface by means of radiation which is applied to irradiation regions of the replication apparatus, wherein surface structurings of the replication surface are shaped into the substrate in the shaping regions and the shaped surface structurings are formed in the substrate in such a way as to preferably permanently remain therein.

The radiation is preferably produced by a laser installation but it is also possible to use radiation which is not monochromatic or not coherent.

The radiation preferably extends completely outside the substrate and impinges on the replication apparatus in which it is partially or completely absorbed. The radiation path prior to impinging on the replication apparatus is such that the substrate and the radiation path do not overlap. Prior to impingement on the replication apparatus the radiation is not transmitted through the substrate and in particular no substantial proportions of the radiation are absorbed in the substrate. In preferred embodiments the radiation, issuing from the laser installation, can be arranged parallel to the substrate and directed onto the replication apparatus so that the radiation passes outside the substrate.

With the apparatus according to the invention, partial regions of a stamping mold can be selected targetedly by the radiation as desired for the shaping operation and thus the markings formed from the shaping effects on the partial regions can be of an individualized nature. It is particularly advantageous in that respect that the process can be carried out by this apparatus independently of the absorption properties of the respective substrate as absorption of the radiation takes place substantially in the replication apparatus and not in the substrate. It is further advantageous that the individualized identification is transferred in the form of the selection of the regions during the same replication operation with a security feature, namely the for example diffractive regions themselves.

An advantageous development of the invention provides that the apparatus has an additional energy source which is preferably separate from the radiation-producing device. The additional energy source which can be in the form of a controllable heat source provides for temperature control of the replication apparatus in the region of the replication surface, preferably homogenously for a relatively large portion of the replication surface. It is in thermal contact with the replication apparatus or energy can be contact-lessly transmitted to the replication apparatus by radiation. In addition, in advantageous configurations, the additional energy source is separate from the radiation-producing device. The additional energy source can introduce the energy into the replication apparatus independently in respect of time and location from the energy input from the radiation-producing device. In preferred embodiments the input of energy from the additional energy source is preferably permanently effected into the replication apparatus at a time prior to the input of energy from the radiation-producing device or locally in relation to the direction of movement of the replication surface prior to the input of energy from the radiation-producing device. The input of energy into the replication apparatus by the additional energy source preferably requires no or only a low level of local resolution, while in addition the local distribution of the energy input does not have to be rapidly variable. The additional energy source can be of a structurally simpler and less expensive nature by virtue of those lower demands, in contrast to the radiation-producing device.

Zones at different temperatures can be produced on the replication surface by the co-operation of the temperature field of the replication surface, which is produced by the additional energy source, with the latent heat image produced by the radiation. Only the zones of the replication surface whose temperatures are within the process window of the shaping operation are durably permanently shaped into the substrate.

The additional energy source can act on the entire surface area or on surface portions of the replication surface. In embodiments in which the additional energy source acts substantially or over the full surface area preferably homogenously with a temperature-setting action on the replication surface, the shaping regions can be decisively determined by the radiation, for example the laser radiation. In other constructions only partial regions of the replication surface are in particular homogenously subjected to temperature control, in which case by virtue of that process implementation the shaping regions are then preferably restricted to the temperature-controlled regions. In those embodiments an initial preliminary selection of the shaping regions is effected by virtue of the selection of the partial regions on which the additional energy source acts.

The additional energy source can be permanently or temporarily connected to the replication apparatus by way of direct thermal contact, for example in the form of heating wires or strips or inductive heating devices which are completely or partially integrated in the replication apparatus. Energy transfer in other embodiments can be effected by coherent or incoherent radiation, in particular laser radiation, or convection, in which case the additional energy source is for example in the form of a heating laser device or a heat radiating device.

An advantageous configuration provides that there is a control means, in particular a freely programmable control means, which controls the selection of the irradiation regions preferably by actuation of the radiation-producing device.

In this advantageous development the patterns of the markings are prepared in the form of preferably digital items of information, for example as a data file, which were produced by image processing programs, by computer-aided processes or the like. Those items of information are converted by the control means, in particular by actuation of the laser installation, into a time-dependent change in the power density in relation to surface area of the radiation impinging on the replication apparatus. The change in the power density in relation to surface area is preferably effected by a sequentially writing laser beam or by a change in the beam profile by means of a controllable imaging mask. The shaping regions and thus the pattern of the marking are determined by the controlled selection of the irradiation regions.

Particularly if the replication apparatus is embodied in the form of a replication roller, it is possible to produce extended markings with patterns, wherein the patterns can be longer in the direction of advance of the substrate, than the periphery of the replication roller. It is also possible to produce patterns whose longitudinal extent in the direction of advance of the substrate is a multiple of the transverse extent thereof, for example a banner in the transverse format with text or wallpaper. In particular the pattern can have an endless design, that is to say a configuration in which component parts of the pattern are not repeated or are repeated independently of the roller periphery.

A further development of the apparatus is advantageously provided if there is a cooling apparatus for cooling the replication surface, by which in particular a latent heat image produced can be extinguished or modified in some way. The cooling apparatus can be in the form of a blower, in which case an air flow produced by the blower is directed onto the replication surface and cools same. A gas flow cooling action can perform a similar function, in which case a flow of gas, preferably a flow of nitrogen or inert gas, impinges on and also cools the replication surface.

In further configurations, the cooling apparatus can be in the form of a cooling roller which is arranged in parallel displaced relationship with respect to the replication roller and contacts same along a line-shaped surface. The thermal contact between the replication roller and the cooling roller provides for dissipation of heat and thus cooling of the replication roller.

When using a replication roller the cooling apparatus is preferably arranged in such a way that it acts on the replication surface in a region which, in the direction of rotation of the replication roller, is between the contact region of the replication apparatus and the substrate and the point of impingement of the radiation on the replication surface.

A further advantageous development of the apparatus provides that the replication surface is structured with a surface relief. That surface relief is the negative for the structures which are transferred onto the substrate in the shaping operation. The replication surface can be completely or partially structured. The depth of the surface relief is preferably between about 0 and 20 µm, in particular between 0.1 and 0.5 µm. Particularly for forming a diffractive or holographic structure on the substrate, the surface relief can be produced in a grating configuration in partial regions or over the full surface area involved. The grating spacing, that is to say the spatial frequency, is preferably between 4,000 lines per mm and 10 lines per mm, in particular 1,000 lines per mm. The replication surface can also be subdivided into partial regions whose dimensions are preferably less than 0.3 mm and which differ from each other by virtue of the spatial frequency, the grating orientation, the grating nature or other parameters.

In a further advantageous configuration of the invention the partial regions can be arranged in periodically repetitive manner, in particular alternatingly. Possible embodiments provide that a respective arrangement of various partial regions, that is to say for example an arrangement of between two and six and preferably three partial regions, forms a pixel unit. A plurality of pixel units can be arranged to form a surface image. Preferably the three partial regions referred to by way of example, by virtue of their grating structure, represent the three primary colors. That pixel unit or also the partial regions can be arranged on the replication surface in regularly or periodically repetitive relationship, for example in grating form or alternatingly.

In particular to produce a matt structure on the substrate the surface relief can also be provided with surface structures which involve a stochastic or quasi-stochastic distribution. A matt structure on a substrate produces a particular optical effect in the form of diffuse scatter of the light incident on the substrate. For producing a matt structure, the surface relief has surface structures, for example grooves, channels, craters, holes etc., of which the respective shapes and/or orientations are similar or of any desired nature and which can be distributed on the replication surface uniformly, stochastically or quasi-stochastically. For example the surface relief can be provided with a structure similar to a brushed surface.

In a further advantageous configuration the replication apparatus has a pressure die or mold of metal film, in particular nickel or a nickel compound. The use of metal films of nickel or nickel compounds facilitates galvanic shaping of a diffractive structure for producing a master. As an alternative to those materials it is also possible to use a material which has a particularly high level of absorption and in particular a higher level of absorption than nickel, for the wavelength of the laser radiation used. That provides that the energy required for producing the latent heat image on the replication apparatus, preferably on the replication surface, would be markedly reduced. Accordingly lower-power and thus less expensive lasers could be used in the apparatus.

The laser installation can be desirably have a scanner system and/or a mask projection system. For using a scanner system, the laser beam is shaped in such a way that the diameter of the laser spot upon impinging on the replication apparatus is preferably in a range of between 0.05 mm and 2.0 mm. That laser spot can be guided in sequentially writing mode over the replication apparatus by the scanner system. In that case the scanner system can be a system with deflection devices, for example deflection mirrors, or a system with flying optics. The position of the laser spot on the replication apparatus can be altered by the user by a control means, preferably a path control means, so that various geometrical shapes, images, letters and numbers can be flexibly written on the replication apparatus with the laser spot. In other embodiments the replication apparatus can be exposed over its surface by a mask projection system. In that case the beam shaping system can be such that the image of a mask, for example by a 4f-structure, is produced on the replication apparatus in such a way that the shape of the laser spot corresponds to the shape of the openings in the mask. In that case the mask can be a rigid mask or however a matrix arrangement of elements which controlledly transmit or extinguish the laser beam, which elements can be for example movable mirrors or liquid crystal elements.

In addition the apparatus can be of such a design configuration that the laser beam produced by the laser installation is controllable or regulatable in respect of further parameters such as power and/or power density in relation to surface area and/or distribution of power density in relation to surface area. The total energy input in the replication apparatus is determined by the power and the switch-on duration (beam-on time) of the laser. The time-dependent power density in relation to surface area on the replication surface together with the switch-on duration of the laser determines the energy input per unit of surface area into the replication apparatus.

Semiconductor, sold state or gas lasers, in particular Nd:YAG, excimer or diode lasers, can be used in the laser installation. Diode lasers as representatives of semiconductor lasers enjoy advantages as they can be quickly modulated in power and are convenient and desirable in terms of acquisition. The laser radiation from a diode laser array can be focused by way of a common optical system onto the replication apparatus, providing a common focus, or the diode laser array produces an image over a surface area, in which case switching individual diodes or regions of the diode laser array on or off makes it possible to implement areal exposure of the replication apparatus with a controllable level of power density in relation to surface area or distribution of the power density in relation to surface area. In other embodiments the laser beam is passed by way of one or more, in particular also image-transmitting optical waveguides.

An advantageous configuration of the apparatus is provided if the laser beam is directed onto the replication surface of the replication apparatus, impinging on the replication surface. In this embodiment the laser beam is directed onto the replication surface of the replication apparatus by the beam guidance and shaping effect, so that it is at least partially absorbed in the replication apparatus in the region of the replication surface, and introduces an energy input into the replication surface. In embodiments of the replication apparatus in the form of a rotating cylinder, the location of laser exposure is preferably in front of the replication gap on the cylinder in the direction of rotation thereof, the replication gap being the contact region between the replication apparatus and the substrate. The spacing between the point of impingement on the cylinder and the replication gap can be such that the latent heat image produced still does not become blurred by virtue of thermal conduction, and the replication apparatus is still not covered by the substrate. The interaction of the laser beam with the replication apparatus in this embodiment takes place on the replication surface. This embodiment has the advantage that the process of temperature field production and thus selection of the shaping regions is dependent on the material of the mold and independent of the material properties, in particular absorption or transparency, of the substrate used.

A further advantageous configuration of the apparatus is provided if the replication apparatus has an inside surface which is parallel to and/or concentric with the replication surface and the radiation is directed onto the inside surface so that the laser beam impinges on the inside surface. The laser beam is not directed onto the replication surface or is not directed only thereonto, but it can impinge on a surface which is arranged on the rear side of the replication surface. That second surface can be in thermally conductive contact with the replication surface, in which case in particular the resistance to heat conduction is such that it is similar or the same over the entire surface area or in partial regions. If now that second surface is subjected to the laser radiation and heated, the replication surface is also heated by virtue of heat conduction. For exposure of the second surface to the radiation, it can be provided in terms of apparatus that the laser beam is directed in the opposite direction to the surface normal to the second surface and impinges on that inside surface. In this embodiment of the replication apparatus in the form of a rotating cylinder, the location of exposure can be in a region which in the direction of rotation begins upstream of the replication gap and terminates in the replication gap, in which respect the term replication gap is used to denote the contact region between the substrate and the cylinder during the shaping operation. The position of laser irradiation can also be dependent on speed of rotation, laser power and thermal resistance between the second surface and the replication surface.

An advantageous development of the replication apparatus provides that various layers are arranged between the inside second surface and the replication surface. As already mentioned, the outermost layer is generally formed from a metal film, in particular a film of nickel or a nickel compound. A heat-conducting layer and/or an absorption layer can be disposed on the side of said layer which is remote from the replication surface, in which case the absorption layer has a different level of absorption from the metal film and in particular a higher level of absorption. In addition it is possible to arrange a transparent layer which can also be a body which is transparent in relation to the laser wavelength, in particular a plate or a cylinder casing.

The object of the invention is further attained by a process as set forth in claim 15. The process provides for the production of a marking on a substrate, preferably a film, in particular a transfer film, wherein energy in the form of radiation, preferably laser radiation, is used by a radiation-producing device for producing at least one shaping region on a replication surface of a replication apparatus, and wherein the shaping region of the replication surface is shaped onto the substrate by the replication apparatus contacting the substrate under pressure, and wherein the radiation for producing the shaping regions is supplied completely outside the substrate.

The replication apparatus is exposed with radiation, in which case the radiation can act directly on the replication surface of the mold and heats the mold or it can be absorbed by other regions of the replication apparatus and heats the mold, in particular the replication surface of the mold, by thermal conduction.

By virtue of irradiation of selected regions of the replication apparatus, regions at different temperatures can be produced on the replication surface of the mold. In particular regions are produced at a temperature which corresponds to the working temperature of the shaping operation, these being referred to as shaping regions.

In that case the radiation is guided in such a way that it does not penetrate into the substrate before impinging on the replication apparatus.

In the co-operation of the substrate and the replication apparatus under pressure the shaping regions of the mold which are produced can be durably permanently shaped into a substrate.

The individualized marking preferably comprises the shapings of the partial regions of the replication surface, which were selected by the above-described temperature implementation process for a shaping operation. Individualization of the markings, that is to say the change in the selection of the regions shaped, can thus be effected by a change in the temperature distribution on the replication surface. A change of that nature can be effected by way of control of the radiation-producing device, for example the laser installation, or the corresponding beam guidance and shaping devices.

In preferred developments of the process the replication apparatus is subjected to a temperature control effect at least in partial regions of the replication surface, using an additional energy source. The latter is preferably provided separately from the radiation-producing device.

In this embodiment of the process, in a process step the replication apparatus can be heated with the additional energy source so that regions or at least partial regions of the structured replication surface of the mold are at a first temperature. In that respect the energy input is in particular to be such that the heated regions or partial regions of the replication surface which do not contain any additional energy input by the radiation are at the first temperature during the shaping operation.

In a further step in the process the replication apparatus is exposed with radiation.

The co-operation of heating of the replication apparatus by the additional energy source and selective heating by the radiation results in the production on the replication surface of the mold of regions involving different temperatures, in particular at least two regions which are temperature-controlled in different ways. A part of the regions preferably involves the first temperature while another part of the regions preferably involves a second temperature which is achieved by the additional energy input by virtue of the radiation. By virtue of the way in which they are produced, the regions involving the second temperature can be referred to as heat combination regions.

The process can be carried out in such a way that either the first temperature or the second temperature corresponds to the working temperature of the shaping operation so that, in a further step in the process, either the partial regions at the first temperature or the partial regions at the second temperature can be durably permanently shaped onto the substrate.

There can be a time interval between the energy input by the additional energy source or the radiation-producing device and the shaping operation, by virtue of the period of time required for the movement of the partial region from the position of the energy input to the position of the shaping operation. If there is a time interval between heating of a partial region of the replication surface and the shaping operation in respect of that partial region, then the heat field distribution which is initially produced on the replication surface can alter due to heat conduction effects. In particular the set temperatures in the heated regions can decrease as heat can flow away for example into the replication apparatus. For possible compensation for that effect, regions or partial regions of the replication surface can firstly be set to a higher temperature than in particular the first or second temperature respectively so that, after the heat losses due to heat conduction, during the subsequent shaping operation, those regions or partial regions are then at the first and second temperature respectively.

It is advantageous if that time interval is as short as possible or if that time interval is at least equal for all partial regions of the replication surface as then the heat conduction effects are of a similarly pronounced degree, in regard to all partial regions.

The process can also be operated continuously, in which respect process steps are carried out at the same time.

The process can be implemented in such a way that the first temperature is in a plastic temperature range for the respective substrate and the second temperature is in a flow temperature range.

If the replication apparatus is in contact with the substrate under pressure and while there is in a partial region a temperature which is in the plastic temperature range, the structured replication surface is durably permanently plastically shaped in that partial region.

If the temperature is within a flow temperature range which is above the plastic temperature range, then after separation of the mold from the substrate, the deformed material of the substrate will begin to flow. As a result, the shaped surface structurings of the substrate material are smoothed so that they are not retained as optically active structures on the substrate.

In this implementation of the process therefore the partial regions which have been raised to plastic temperature and which have not received any additional heat input by virtue of the radiation can be transferred onto the substrate. Negative selection of partial regions can be effected by virtue of the radiation.

In accordance with another configuration of the process the first temperature is set in an elastic temperature range and the second temperature in a plastic temperature range, the elastic temperature range being below the plastic temperature range.

When a shaping operation is carried out, the partial regions whose temperature is in the elastic temperature range will cause only elastic deformation of the substrate. After separation of the mold from the substrate the surface structures produced experience elastic return and the substrate again assumes approximately its original surface shape.

In this embodiment of the process therefore the heat combination regions are selectively transferred. The additional heat input by the radiation therefore represents positive selection of partial regions.

The substrate can be made up of a plurality of layers. The specified temperatures or the specified temperature ranges of the substrate involve in particular temperatures or temperature ranges of a thermoplastic layer which is component part of the substrate. Further layers of the substrate, for example the carrier layer of the substrate, can be at a different temperature. In general terms the temperature or the temperature range of the substrate is preferably the temperature or the temperature range of the thermoplastic layer.

In an advantageous development of the process the replication surface, prior to the interaction with the radiation, is heated completely or only in partial regions, in a homogenous manner. The heating of surface portions means that a coarse selection of the partial regions to be transferred can already be effected in the initial stages as it is possible that partial regions, without that heating, do not reach the working temperature necessary for the shaping operation.

In a further advantageous modification the replication surface is cooled completely or in partial regions after the shaping operation and prior to the following energy input by the radiation-producing device. Cooling can be effected by heat dissipation by way of a thermal contact and/or air or gas cooling. The cooling operation, particularly in permanent operation of the apparatus, provides that the temperature field of the replication surface is controlledly reduced to temperatures which are preferably below the necessary temperature for a shaping operation. In addition cooling obviates overheating of the replication apparatus.

In further embodiments the radiation is either directed directly onto the replication surface or the radiation is applied to a surface remote from the replication surface. When the replication surface is subjected to exposure, the angle of incidence of the laser radiation can be varied, in particular if the replication apparatus is in the form of a roller-like stamping cylinder. Changes in the angle of incidence of the laser radiation on the replication surface can lead to marked changes in absorption of the laser radiation. Thus the angle of incidence can be used as an additional process parameter to be varied in carrying out the process.

It is advantageous in regard to applying the radiation to a surface remote from the replication surface, that the irradiation operation can be effected shortly before the mold comes into contact with the substrate or while the mold is already in contact with the substrate. The surface remote from the replication surface can be of such a nature that it is accessible for the radiation when the mold is already in contact with the substrate. The time interval between irradiation and the shaping operation can thereby be freely adjusted.

An advantageous development of the process provides that the replication apparatus used is a replication roller, wherein application of the radiation to the replication roller takes place at a first angular position of the replication roller and contact of the replication roller with the substrate takes place at a second angular position. Optionally, cooling of the replication roller takes place at a third angular position and a temperature control effect for the replication roller takes place at a fourth angular position. The process is of an advantageous configuration if the intermediate angle between the first and second angular positions in the direction of rotation of the replication roller is so small that the latent heat image produced by the radiation in the first angular position, after rotation of the replication roller into the second angular position, still has sharp contours. That is afforded for example if the lack of sharpness or blur of the latent heat image, which has occurred due to heat conduction, is less than the reciprocal, desired resolution of the replication process. The definition of the blur circle from geometrical optics can be used as a measurement in respect of lack of sharpness. The angle between the second and first angular positions in the direction of rotation is preferably to be set at as large a value as possible, in particular greater than 180°, in order to achieve homogenization of the temperature profile on the replication surface. The angles between the second and third angular positions and/or between the third and fourth angular positions are each preferably to be set at as small a value as possible, in particular less than 90°, in the direction of rotation, in order also to promote homogenization of the temperature profile on the replication surface.

In preferred embodiments the radiation is transmitted to the replication apparatus either over an area and/or in point fashion in sequentially writing mode. In particular advantages are afforded if the writing process is used together with a rotating stamping cylinder and the replication surface is exposed to radiation. In this embodiment, due to the apparatus structure involved, there is a time interval between the operation of heating a partial region of the replication surface and the shaping operation in respect of that partial region, as the replication surface is covered by the substrate during the shaping operation and cannot be exposed to radiation. If the information is transferred onto the mold in line-wise writing mode by the radiation and if that line is arranged parallel to the replication gap, that at least ensures that the time interval between the exposure process step and the shaping process step is approximately equal for any exposed point on the mold.

Corresponding advantages are afforded with the combination of areal exposure and the use of a stamping punch. In this case an equal time interval between heating and shaping of the partial regions is achieved if initially all partial regions are simultaneously exposed to radiation and then all partial regions are simultaneously shaped. It is however also possible to use the combinations of a writing process and stamping punch, and areal exposure and a stamping cylinder, if that affords other advantages, for example advantages in the radiation exposure process.

This apparatus and process consequently make it possible to shape various markings, for example including document-specific or person-specific markings, onto a substrate from a single mold, in which respect partial regions of that mold can be selectively activated or deactivated for the shaping operation.

BRIEF DESCRIPTION OF THE DRAWINGS

Further features, details and advantages of the invention will be apparent from the description hereinafter of an embodiment by way of example of the process and embodiments by way of example of apparatuses for producing a marking. In the drawing:

FIG. 6 shows a plan view of a portion of the surface of the replication apparatus of FIG. 1a and a marking which was produced by the replication apparatus.

DETAILED DESCRIPTION OF THE INVENTION

Figure 1A:
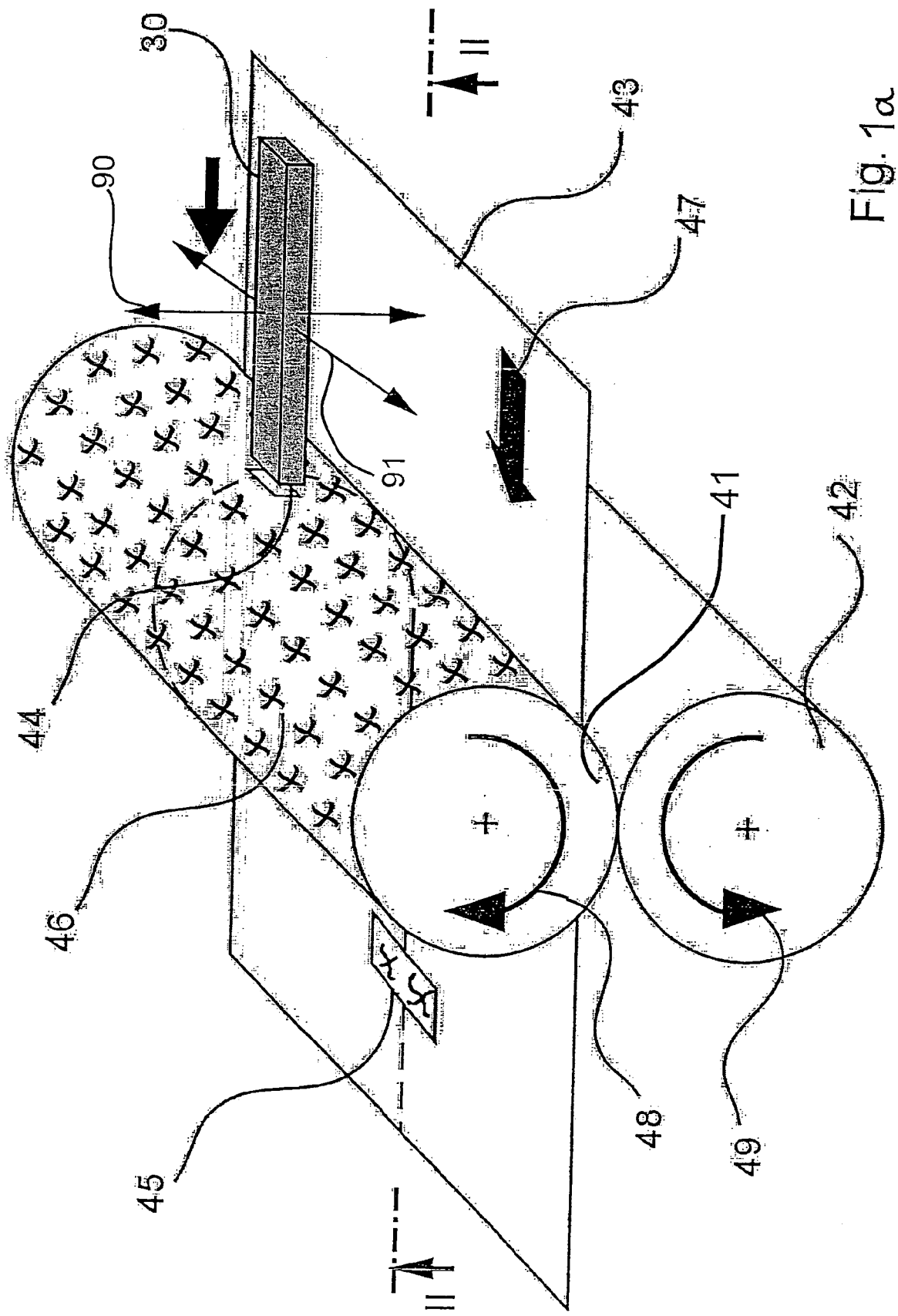
FIGS. 1a, b and c show embodiments of an apparatus for applying a marking to a substrate.

FIG. 1a is a diagrammatic view showing the structure of an embodiment of an apparatus for producing a marking on a substrate 43. In the illustrated embodiment the substrate 43 is in the form of film. The film can be a transfer film. The apparatus has a replication roller 41 and a counterpressure apparatus 42 in the form of a roller, the substrate 43 being guided between the replication roller 41 and the counterpressure apparatus 42. The replication roller is exposed from the outside with a laser beam 30.

The substrate 43 is of a thickness of less than 1 mm and can be in the form of a multi-layer composite. At least one layer comprises a transparent plastic material. Further layers can be in the form of metalization layers, interference layers, protective layers, carrier material layers or adhesive layers.

The preferably metallic or metallically encased replication roller 41 is provided with surface structurings in the form of diffraction stamping structures 46 on its replication surface. The diffraction stamping structures 46 are of a depth of between about 0 and 20 μm and involve line spacings or spatial frequencies of between 10 lines per millimeter and 4,000 lines per millimeter.

The counterpressure apparatus 42 is in the form of a cylindrical roller and can comprise rubber or can have a casing consisting of rubber.

The arrow 48 and the arrow 49 show the respective directions of rotation of the replication roller 41 and the counterpressure apparatus 42, the replication roller 41 rotating in the clockwise direction and the counterpressure apparatus 42 rotating in the counter-clockwise direction. The arrow 47 points in the direction of advance of the substrate 43 which moves towards the left in FIG. 1a. The replication roller 41, the substrate 43 and the counterpressure apparatus co-operate in such a way that the replication surface with the diffraction stamping structures 46 is pressed under a given, generally adjustable pressure against the substrate 43 during the rotation of the replication roller 41 and the counterpressure apparatus 42. Shaping of the surface 44 in the form of a marking 45 on the substrate 43 takes place in the contact region between the replication roller 41 and the substrate 43.

The laser beam 30 can expose the surface 44 in areal manner or in modified embodiments in punctiform sequential fashion. Actuation of the laser beam 30 in respect of power, beam direction, power density in relation to surface area and so forth is effected by a control device. The laser beam 30 can be pulsed or power-modulated, it preferably operates at constant power. The laser beam 30 can be stationary or moved in the exposure operation. In the case of areal exposure, for example by means of a mask projection process, the laser beam is preferably stationary while the replication roller rotates. In modified embodiments the movement of the laser beam 30 takes place synchronously with respect to the rotating replication roller 41, in the direction of the arrow 90. In the case of writing exposure processes using a punctiform or almost punctiform laser beam 30, the movement of the laser beam 30 can be synchronous with respect to the rotating replication roller 41 in the direction of the arrow 90 and also parallel to the longitudinal extent of the axis of rotation of the replication roller 41 in the direction of the arrow 91. For punctiform exposure, the laser beam can be focused and can involve a small beam diameter, for example less than 1 mm.

The replication roller 41 is heated by a controllable heat source (not shown) which is an inner heat source, that is to say which acts at the interior, so that the entire region of the replication surface which has the diffraction stamping structures 46 is at a preferably unitary temperature which is below the shaping temperature of the substrate 43, that is to say below the plastic temperature range in the elastic temperature range of the substrate 43.

Only the partial regions of the replication roller 41 are shaped, producing a durably remaining marking 45, if those partial regions, in addition to heating with the inner heat source, have been exposed with the laser beam 30, constituting a heat combination region. An additional energy input takes place within the irradiated surface 44 by the laser beam 30 which can be directed onto the replication roller 41 at any angle, thus resulting in a latent heat image, shown in FIG. 1a in the form of a rectangular area 44, on the replication roller 41. The latent heat image can be of a simple geometrical shape such as for example a circle, a multi-angled shape, a closed polygon, but also the shape of letters, digits or symbols. Energy input into the surface 44 by means of the laser beam 30 is effected on the rotating replication roller 41 in a region which is at a spacing of an angle of rotation of about 90° from the region in which the shaping operation is carried out. That spatial spacing results in a time interval between irradiation and shaping. The energy input by the laser beam 30 is such that, within the irradiated surface 44, the temperature after the exposure operation is within the plastic temperature range of the substrate 43 or, in order to compensate for thermal conduction effects by virtue of the time interval involved, above the plastic temperature range of the substrate 43. By virtue of that temperature control procedure the partial region 44 of the replication roller 41 is at a surface temperature, in the replication operation, which is in within the plastic temperature range, and the substrate 43 is durably permanently shaped in the contact region between the replication apparatus 41 and the substrate 43. Any shape and structure of the marking 45 can be produced on the substrate 43 by altering the shape and structure of the irradiated surface 44.

In a possible mode of operation of the apparatus the laser beam 30 is switched on and off in control sequences, thus preferably producing markings 45 which are offset from each other and in particular spatially separated. The configuration of those various markings 45 can be the same in each case or can differ from one marking to another by virtue of individualized features, for example by serial numbering.

In a further possible mode of operation of the apparatus in FIG. 1a the laser beam 30 can be continuously switched on and the impingement point of the laser beam 30 on the replication roller 41 is moved synchronously with respect to the replication roller 41 in the direction of the arrow 90 and in the transverse direction with respect thereto in the direction indicated by the arrow 91, for example by parallel displacement or by angular deflection of the laser beam 30. In that mode of operation a marking 45 can be formed, with a pattern which varies in the direction of advance 47 of the substrate 43.

In particular this mode of operation allow control sequences of movements of the laser beam 30 for producing an individual marking to be implemented over a plurality of revolutions of the replication roller 41, that is to say over a plurality of working cycles.

For example it is possible in that way to produce text of any length in the direction of advance movement 47, on the substrate.

In a modification of that mode of operation the laser beam 30 is continuously switched on and the change in the power density in relation to surface area on the replication roller 41 is effected by a change in the beam profile of the laser beam 30.

A combination of those modes of operation is also possible.

Figure 1B:
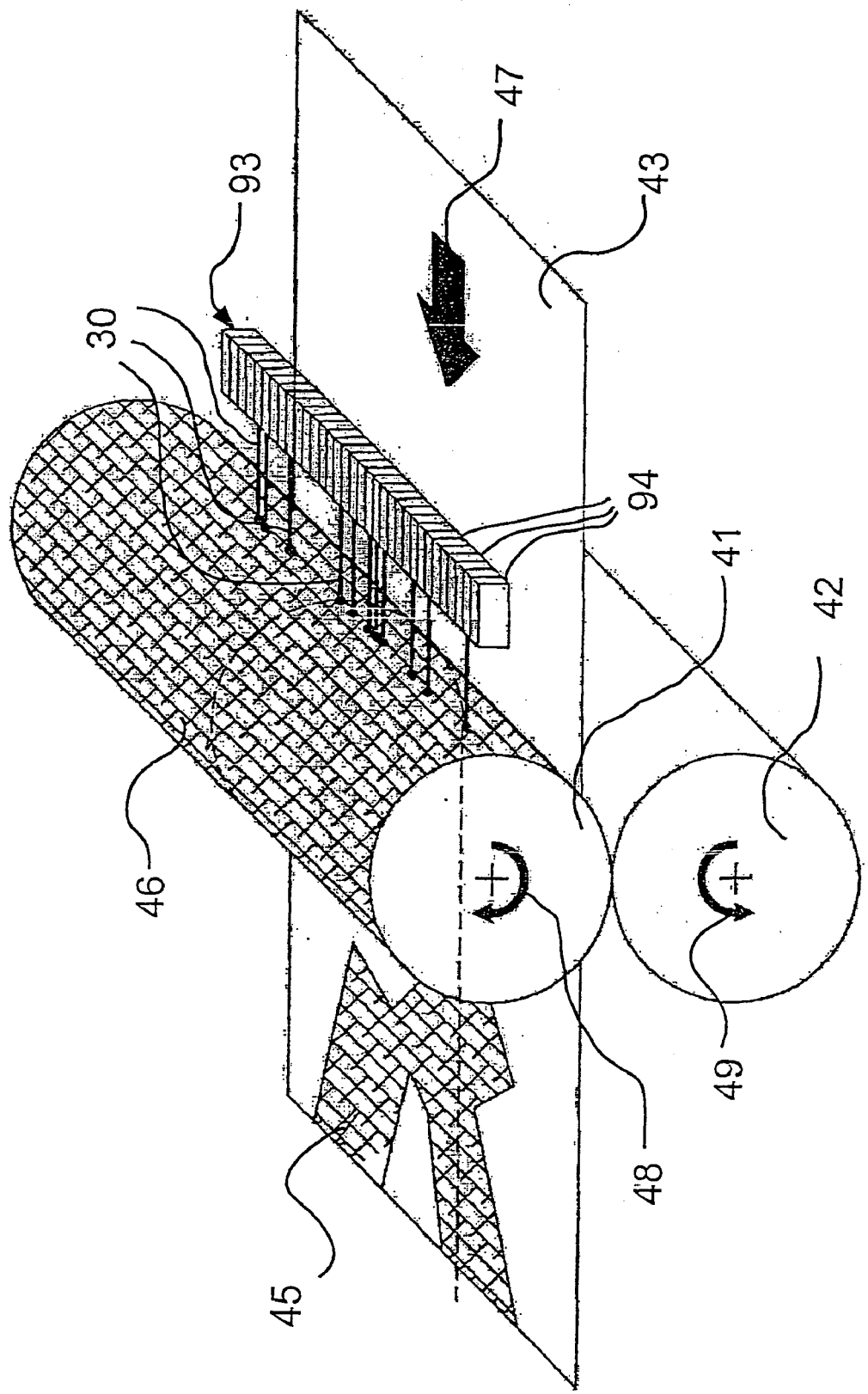

FIG. 1b shows a modified embodiment of the apparatus in FIG. 1a, involving an areal exposure process. The apparatus in FIG. 1b is similar to the apparatus in FIG. 1a, but the apparatus in FIG. 1b has a diode laser array 93 as the radiation-producing apparatus.

The diode laser array 93 includes a plurality of diode lasers 94 which are respectively arranged in parallel relationship with each other and in the same orientation in an array so that the radiation emission direction is the same in the case of all diode lasers 94. The diode lasers 94 are individually actuable and modulatable in their power, by way of a control device (not shown). The diode laser array 94 is arranged with its longitudinal extent parallel to the longitudinal extent of the axis of rotation of the replication roller 41, the laser beams 30 thus being directed onto the replication roller 41. The spacing between the diode laser array 93 and the replication roller 41 is dependent on the radiation characteristic of the diode lasers 94, or dependent on an optional interposed optical arrangement (not shown in FIG. 1b), and is of such a nature that it produces a power density distribution of the laser beams 30 on the replication roller 41, which corresponds to the requirements involved. By virtue of a combination of variations in power density in relation to surface area, which are caused by the controlled modulation of the diode lasers 94, and the rotational movement of the replication roller 41, it is possible to produce any exposure patterns in the replication roller 41, by means of which any markings 45 can be produced on the substrate 43.

Figure 1C:
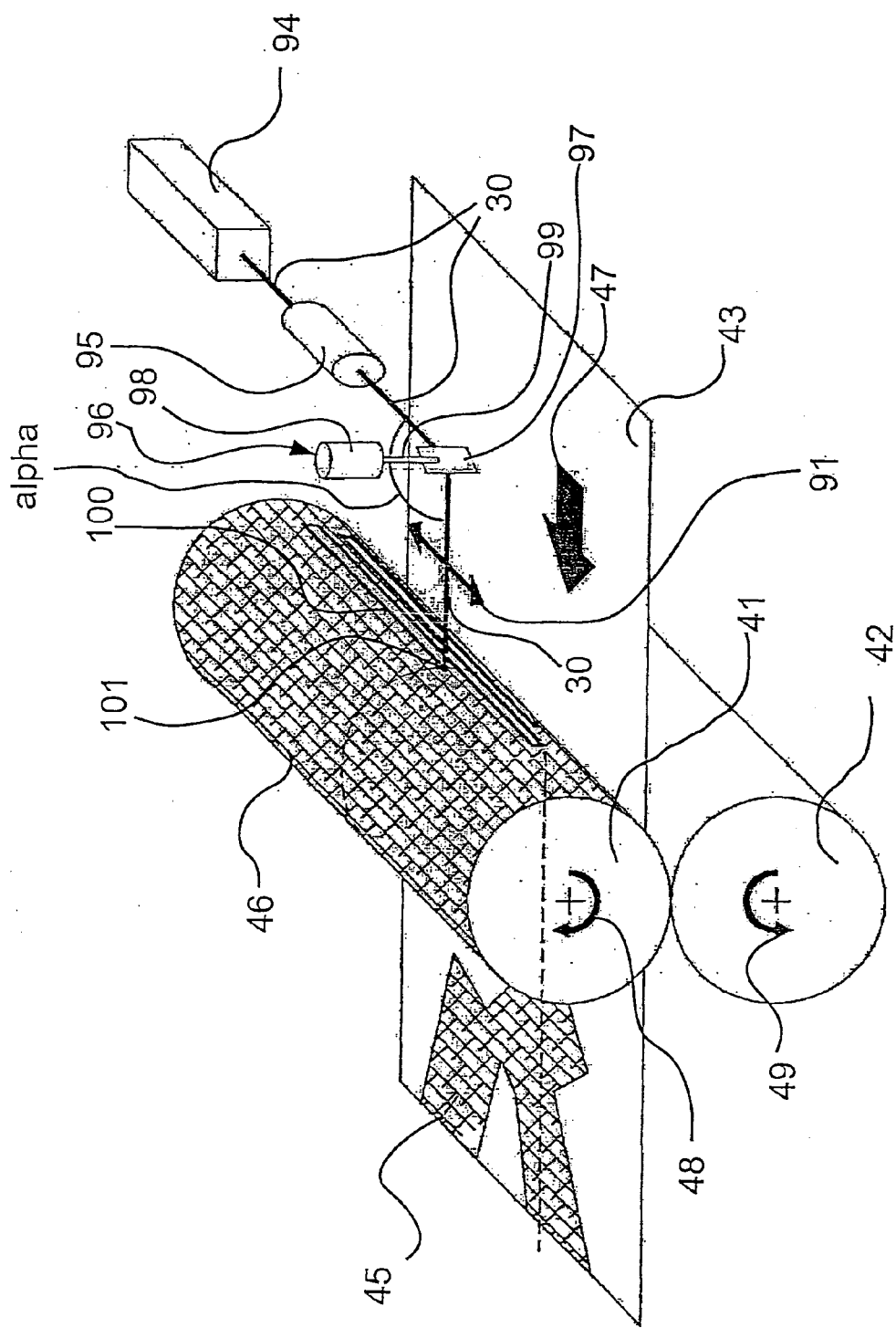

FIG. 1c shows a further modified embodiment of the apparatus of FIG. 1a with a writing exposure process. The apparatus of FIG. 1c has an arrangement in which, similarly to the arrangement of FIG. 1a, a substrate 43 is guided between a replication roller 41 and a counterpressure apparatus 42 and a marking 45 is produced thereon. The replication roller 41 is also exposed with radiation from the outside with a laser beam 30. The laser beam 30 is passed from a laser source 94, with the interposition of an optical arrangement 95 and a deflection unit 96, onto the replication roller 41 where the laser beam impinges thereon, producing an impingement point 101. The laser source 94 is diagrammatically shown as a cuboid in FIG. 1b and can be of any desired configuration, for example in the form of an Nd:YAG, excimer, solid state, gas, semiconductor laser and so forth. The laser source 94 is arranged above the substrate 43 and spaced from the replication roller 41, being oriented in such a way that the laser radiation 30 issuing at the output is arranged in approximately parallel displaced relationship with respect to the longitudinal extent of the axis of rotation of the replication roller 41. In further configurations of the apparatus the laser source 94 can also be so arranged that the laser radiation 30 issuing therefrom is arranged approximately perpendicularly to the substrate 43 and is suitably diverted. The optical arrangement 95 is arranged downstream of the laser source 94 in the direction of propagation of the laser beam 30 and has optical components for beam guidance and shaping.

In the deflection unit 96 which is arranged at a downstream position in the direction of propagation of the laser beam 30, the laser beam 30 is deflected through a controllable angle alpha, so that the impingement point 101 can be guided over the replication roller 41 in movements parallel to the longitudinal extent of the axis of rotation of the replication roller 41.

The deflection unit 96 has a drive unit 98, for example a motor, in particular a servomotor or a stepping motor, or a galvanometer drive, and a mirror 97 which is connected by way of a drive shaft 99 and has a reflecting front side. The drive shaft 99 is driven by the drive unit 98 and is rigidly connected to the mirror 97. The drive shaft 99 and the mirror 97 can be arranged relative to each other in such a way that the axis of rotation of the drive shaft 99 is in the plane of the reflecting front side of the mirror 97 and the drive shaft 99 does not or only slightly masks the reflecting front side of the mirror 97. In that arrangement a rotary movement of the drive shaft 99, which is produced by the drive unit 98, can cause the reflecting front side of the mirror 97 to be rotated about an angle, with the formation of an axis of rotation in that situation.

The deflection unit 96 is so arranged that the laser beam 30 meets the reflecting front side of the mirror 97 at an angle of alpha/2 and the tilt axis of the reflecting front side of the mirror 97 is arranged approximately perpendicularly to a plane which is formed by the laser beam 30 which is incident on and is reflected by the deflection unit 96.

The optical arrangement 95 can also be arranged downstream of the deflection device 96.

The position of the impingement point 101 on the replication roller 41 in parallel relationship with the longitudinal extent of the axis of rotation of the replication roller 41 is controlled by the deflection unit 96. In combination with the rotational movement of the replication roller 41, an exposure pattern 100 is produced on the replication roller. In the view in FIG. 1c the exposure pattern 100 is in the form of a heat path which is written line-wise and which is sequentially exposed, in the form of a line extending continuously. The heat path extends almost parallel to the axis of rotation of the replication roller 41, the direction of advance of the impingement point 101 changing at each line change.

Figure 2A:
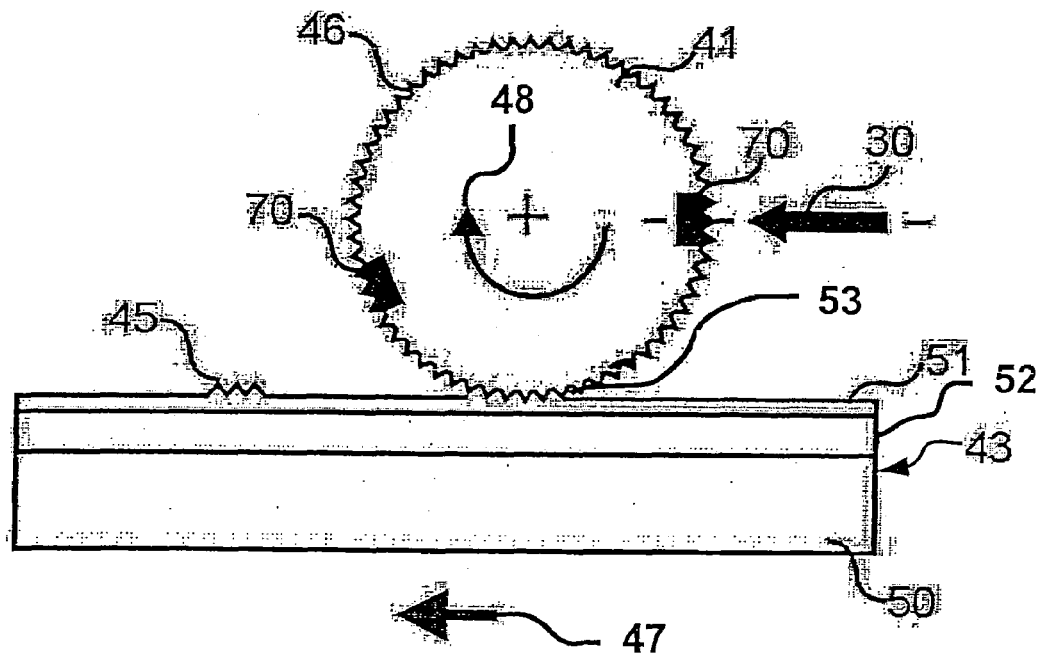
FIG. 2a shows a detail sectional view in a section plane perpendicularly to the substrate through the line II-II of the embodiment in FIG. 1a with a first implementation of the process.

FIG. 2a shows a sectional view of the apparatus of FIG. 1a. The substrate 43 has a layer structure comprising a thermoplastic layer 51, a second layer 52 and a carrier film 50 which is for example polyester or polycarbonate film. The second layer 52 and further layers is or are optional. The second layer 52 or further preferably different layers are in the form of a protective lacquer layer, a metalization layer, an interference layer or an adhesive layer.

The replication roller 41 has diffraction stamping structures 46 which either, as diagrammatically shown here, can be applied over the entire periphery preferably over the full area involved, or however can also be applied only in partial regions.

As already mentioned above, in the rolling operation in respect of the replication roller 41, the replication roller 41 and the substrate 43 co-operate under pressure, in which case the replication roller 41 rotates in the direction of rotation indicated by the arrow 48 and the substrate 43 moves in relation thereto in slip-free relationship in the direction indicated by the arrow 47. The replication roller 41 is heated entirely or in partial regions by the controllable inner heat source (not shown). The laser beam 30 is directed onto the replication roller 41 from the exterior and in a region upstream of the replication gap 53, impinges on the replication surface of the replication roller 41, that surface carrying the diffraction stamping structures 46; the term replication gap 53 is used to denote the contact region between the replication roller and the substrate in the shaping operation.

In the embodiment of the process which is shown in FIG. 2a the replication surface is raised by the inner controllable heat source to a temperature which is within the elastic temperature range. The additional energy input by the laser beam 30 provides that the irradiated surfaces 70 are further heated and thus represent the heat combination regions. The energy inputs are such that the replication surface of the replication roller 41, upon making contact with the substrate 43 in the regions 70, is at a temperature which is within the plastic temperature of the substrate 43 and that the remaining regions are at temperatures which are below the plastic temperature range and for example in the elastic temperature range of the substrate 43. In the operation of shaping the diffraction stamping structure 46 onto the substrate 43, with that temperature distribution, only the regions 70 are durably permanently shaped into the thermoplastic layer 51. In that way a marking 45 whose surface portions which are shaped into the substrate 43 have diffractive structures are introduced into a substrate 43, as an individualized security feature.

The principle of positive selection or negative selection of partial regions on the replication surface of the replication apparatus for shaping onto a substrate will now be described in greater detail with reference to the graphs in FIG. 2b.

Figure 2B:
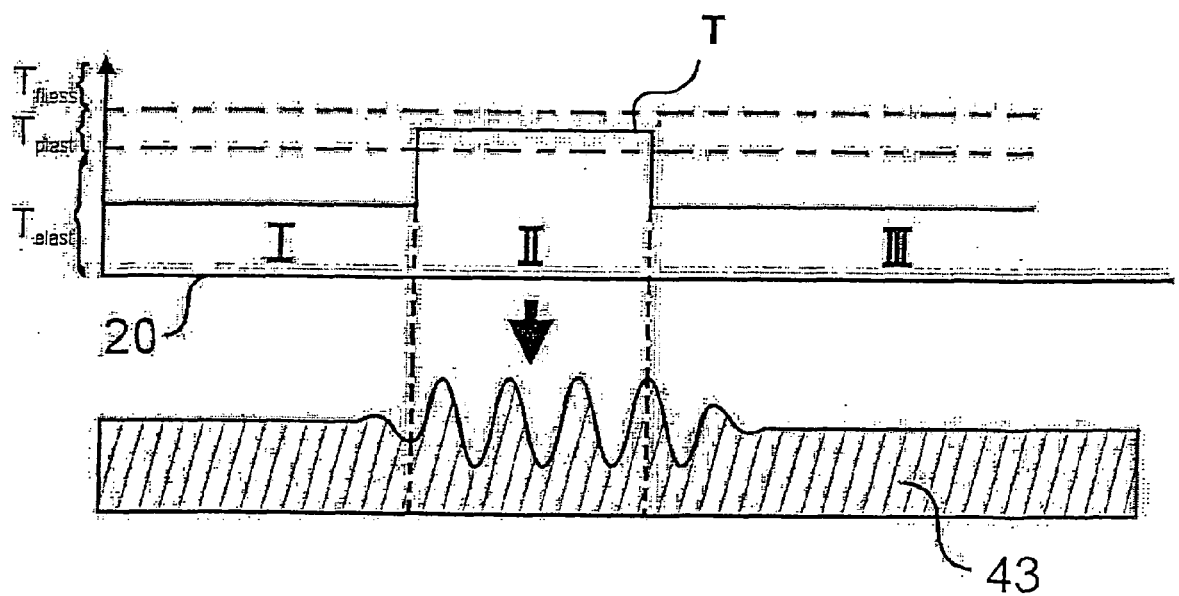
FIG. 2b shows a diagrammatic view of the relationships between heat distribution on the replication apparatus and the shaped region on the substrate in accordance with the process illustrated in FIG. 2a, FIG. 3a shows a detail sectional view in a section plane perpendicularly to the substrate through the line II-II of the embodiment in FIG. 1a with a second implementation of the process.

FIG. 2b shows a co-ordinate system 20, wherein the portion of the periphery of a stamping roller is plotted on the horizontal X-axis while the temperature on the replication surface of that stamping roller is plotted on the vertical Y-axis, at the respective position along the periphery of the roller.

The temperature scale can be qualitatively subdivided into three ranges: the first range is the elastic temperature range $T_{elast}$. The temperature range disposed thereabove, involving higher temperatures, is the plastic temperature range $T_{plast}$. The highest temperature range shown here is the flow temperature range indicated at $T_{fliess}$.

It is only in the plastic temperature range $T_{plast}$ that the structured surface of the roller is durably permanently shaped onto the substrate. That range therefore represents the process window for a successful shaping operation.

The elastic temperature range $T_{elast}$ is established at lower temperatures. Admittedly, elastic deformation of the substrate takes place here upon contact occurring between the stamping roller and the substrate, which takes place under pressure, at least at temperatures near to $T_{plast}$, but as soon as the stamping roller and the substrate are separated again the substrate returns to its original generally smooth surface configuration with an elastically resilient or damped motion.

In the flow temperature range $T_{fliess}$, initially deformation takes place when contact is made between the stamping roller and the substrate under pressure. When however the stamping roller and the substrate are separated again, the substrate material begins to flow, by virtue of the high temperature of the substrate. As a result, surface roughnesses introduced into the substrate are smoothed off, and that also includes the transferred structuring effects. The structuring effects produced in the substrate do not durably remain both in the flow temperature range and also in the elastic temperature range.

In FIG. 2b the surface of the stamping roller in the region I is at a temperature within the elastic temperature range $T_{elast}$. In the region II the temperature is within the plastic temperature range $T_{plast}$ and the region III is again within the elastic temperature range. When the structured surface of the stamping roller is shaped onto a substrate, the structures are shaped in the regions I and III, but the substrate elastically resiliently returns to its original shape again. In the region II, a permanent surface structuring is produced in the substrate by the shaping operation. Thus with such a temperature profile the result produced is a substrate 43 with a positive image, in which no surface structurings are durably permanently impressed into the substrate in the regions I and III and the surface structurings are durably permanently impressed in the region II. The substrate 43 corresponds to the substrate 43 in FIG. 2a on an enlarged scale.

Figure 3A:
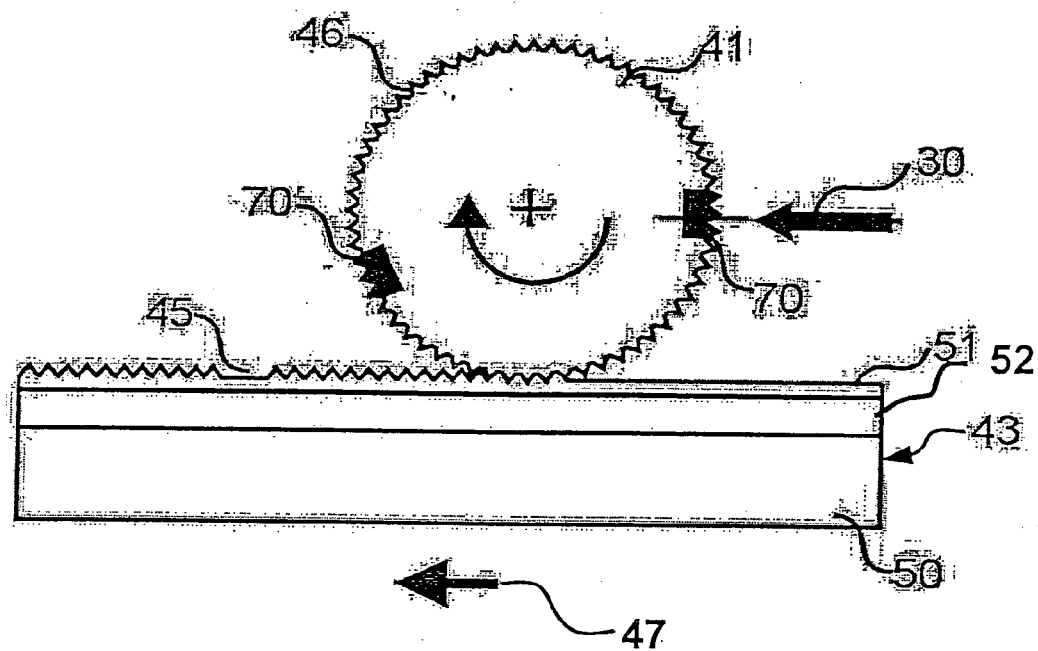
FIG. 3b shows a diagrammatic view of the relationships between heat distribution on the replication apparatus and the shaped region on the substrate in accordance with the process illustrated in FIG. 3a, FIG. 4 shows a diagrammatic view of the heat distribution in a portion of a replication apparatus in cross-section upon exposure with a laser beam, FIGS. 5a and b show diagrammatic views illustrating the principle for the production of a negative and positive image respectively.

FIG. 3a shows the same portion as in FIG. 2a, in another embodiment of the process. In FIG. 3a the surface of the replication roller 41, which carries the diffraction stamping structure 46, is raised by an inner controllable heat source to a temperature which is within the plastic temperature range of the substrate 43.

Due to the energy input by the laser radiation 30, additional energy is introduced in the regions 70 so that they are at a higher temperature. If the additional energy is of such a magnitude that the heating effect causes the regions 70 to reach a temperature which is outside of and indeed above the plastic temperature range, then only the regions of the replication surface with diffraction stamping structures 46 which have not been additionally exposed with radiation are transferred.

Figure 3B:
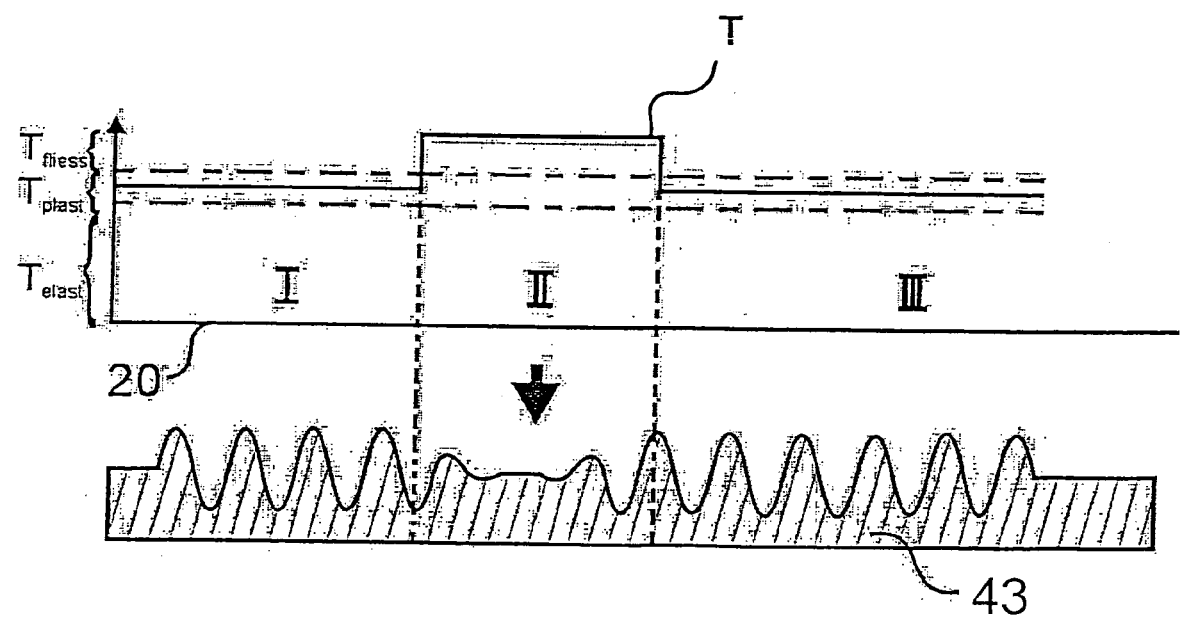

This other process implementation is again diagrammatically shown in FIG. 3b. Here the temperature profile T of the roller in the regions I and III is in the plastic temperature range $T_{plast}$, whereas in the region II the temperature is within the flow temperature range $T_{fliess}$. In a shaping operation, such a process implementation produces a substrate 43 with a negative image, which has no surface structuring in the regions I and III, whereas in the region II the surface profile is so-to-speak healed again. The substrate 43 is the substrate 43 in FIG. 3a on an enlarged scale.

The process shown in FIG. 2a can be used to produce positive images while the process shown in FIG. 3a can produce negative images on a substrate.

FIG. 4 is a diagrammatic view of a portion of a cross-section through a replication apparatus 35 such as for example the replication roller 41 in FIG. 1a. The replication apparatus 35 is provided at its replication surface with surface structurings 36. The isotherms 32 show the heat distribution in the replication apparatus in the region of the surface structuring 36. For simplification purposes, the drawing only shows three isotherms which delimit from each other regions involving different temperatures $T_1$, $T_2$ and $T_3$. Also shown is a laser beam 30 which is directed onto the replication surface with the surface structuring 36 and impinges thereon, and a diagrammatic indication of the absorption volume 31. FIG. 4 shows in detail an implementation of the process for producing regions involving different temperatures. In a first step in the process, in the proximity of the replication surface with the surface structuring 36, the replication apparatus 35 is set to a first temperature $T_1$ by means of a controllable heat source, in the regions I, II and III shown here. In the next step in the process which however can also overlap in time with the first step in the process, the replication apparatus 35 is exposed with the laser beam 30 in the region II. In that operation the laser beam 30 is absorbed at the replication surface with the surface structuring 36, in an absorption volume 31. The energy input in the absorption volume 31 provides that the temperature of the absorption volume 31 increases from the temperature $T_1$ further to a temperature $T_3$. Due to heat conduction, the temperature range $T_1$ is displaced further into the replication apparatus and a heat distribution as shown in FIG. 4 is produced. Depending on the initial temperature $T_1$ and the energy input as well as the position and the extent of the laser beam 30, it is possible to produce a temperature profile as shown in FIG. 2b for a positive image or a temperature profile as shown in FIG. 3b for a negative image on the replication surface.

FIGS. 5a and b show the principle by which an individualized security feature can be produced by various embodiments of the process. Shown at the left in each case as a plan view is a partial region of a replication surface such as for example from the replication roller 41 of FIG. 1a with a structured surface 2. Shown at the right as a plan view is a portion 4 from a substrate after the shaping operation as for example from the substrate 43 in FIG. 1a.

In FIG. 5a the k-shaped surface portion 3 of the surface 2 is at a temperature T which is within the plastic temperature range $T_{plast}$ of the substrate. Outside that region the surface 2 is at a temperature which is outside the plastic temperature range $T_{plast}$. In a shaping operation with that temperature distribution a substrate 43 is provided with a positive image 5 whose mirror-image k-shaped surface is filled with the impression of the surface structurings of the structured surface 2.

In FIG. 5b the k-shaped surface is at a temperature T outside the plastic temperature range $T_{plast}$ and the remaining regions of the surface 2 are at a temperature T within the plastic temperature range. The permanent impression on the substrate 43, which results from that temperature distribution in a shaping operation, is a negative image 6, wherein the regions which are complementary to the mirror-image k-shaped surface are filled with the impression of the surface structurings of the structured surface 2.

FIG. 6 shows another portion of the replication surface of the replication roller 41 in FIG. 1a with a diffraction stamping structure 46 which is subdivided into various partial regions. Those partial regions have been formed from a limited number of diffraction patterns which differ in respect of spatial frequency, grating spacing, curvature of the grating, symmetry of the grating or other parameters. As representative of the many possible options, the drawing shows partial regions with three different diffraction patterns, namely 80, 81 and 82. Each partial region 80, 81, 82 has only one respective diffraction pattern. Those different partial regions 80, 81, 82 are arranged in regularly alternating relationship. Preferably the partial regions 80, 81, 82 are in the form of defined surface fields of square contour, for example with side lengths of less than or equal to 0.3 mm. By virtue of the process presented herein, it is now possible, by exposure with radiation, in particular laser radiation, to activate or deactivate partial regions 80, 81, 82 for transfer from the replication roller onto the substrate, in order to produce a positive or a negative image in a replication operation. An image 85 produced in that way has partial region shapings 80a, 81a, 82a in respect of the partial regions 80, 81, 82.

In this embodiment the partial regions 80, 81, 82 of the diffraction stamping structure 46 are selected by the heat distribution in the replication apparatus in such a way that the image 85 has image regions 86, 87, 88 which each have only one kind of diffraction patterns, that is to say in each case they are formed only from one kind of partial region shapings 80*a*, 81*a*, 82*a*. When viewing the image 85, those image regions 86, 87, 88 comprising individual separate partial region shapings appear as full-area, homogenous image regions as are known from conventionally produced images, with the difference that the image regions 86, 87, 88 have particular optical properties.

Figure 7:
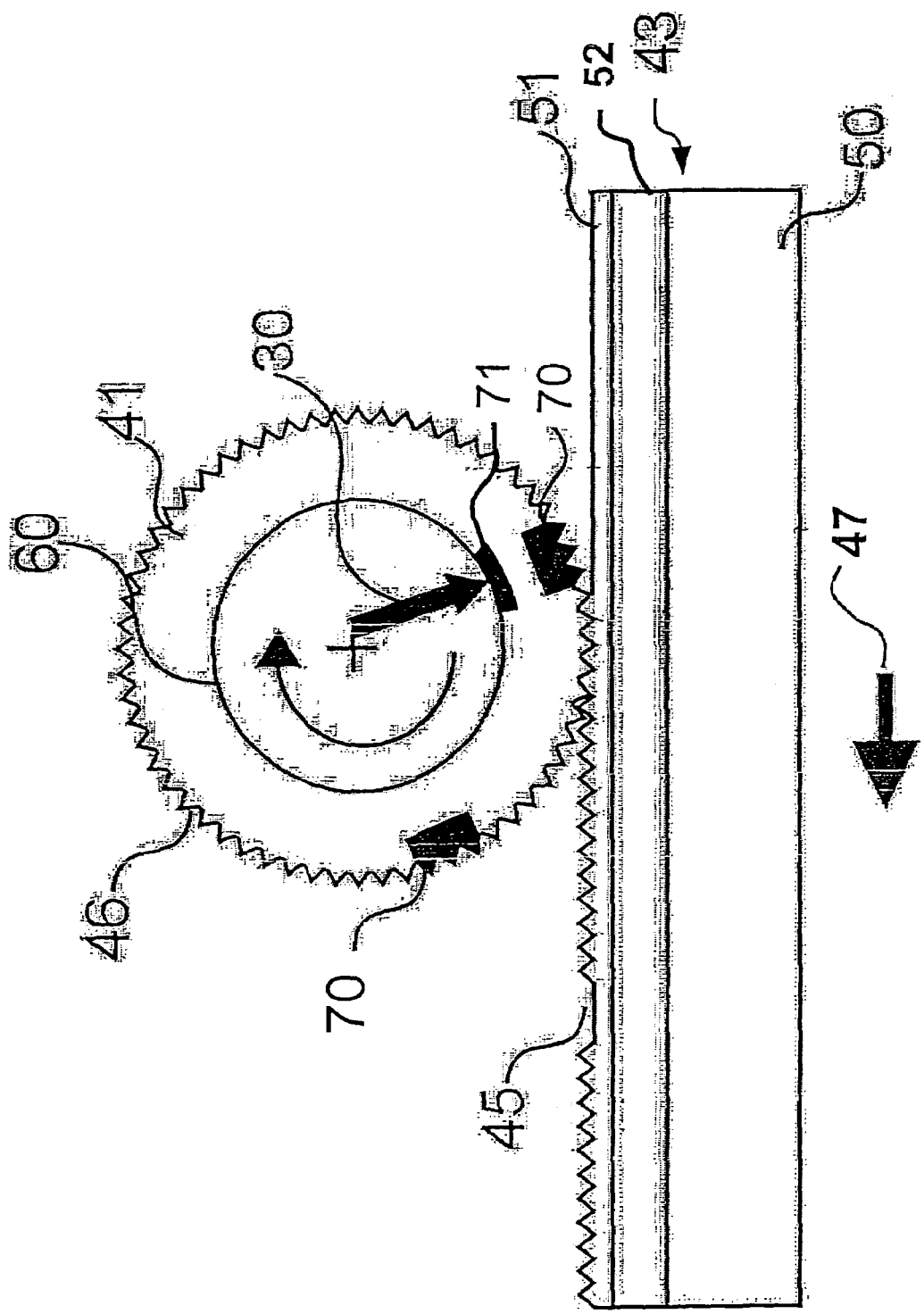
FIG. 7 shows a detail sectional view in a section plane perpendicularly to the substrate through the line II-II of the apparatus in FIG. 1a of a modified embodiment.

In the embodiment of FIG. 7 the structure of the apparatus is similar to that of the apparatus in FIG. 2*a*. In FIG. 7 exposure of the replication roller 41 with the laser beam 30 is effected by the exposure of irradiation regions 71 on a second surface 60 which is arranged internally in concentric relationship with the roller surface carrying the diffraction stamping structure 46. The laser beam is completely or partially absorbed in the irradiation regions 71 and a heat input into the replication apparatus occurs. The increase in temperature in the regions 70 on the replication surface occurs due to heat conduction from the inward irradiation regions 71. The shape of the irradiation regions 71 which are exposed with the laser beam 30 can be produced by mask projection processes or writing processes, similarly to the embodiment of FIG. 2*a*. In this embodiment the time spacing between irradiation and shaping can be very short as the rotational angle displacement between the irradiation surface 71 and the contact region of the substrate and the replication roller 41 can be very small. In particular embodiments the entire laser source can be integrated in the replication roller, in particular when using diode lasers. A feed by way of one or more optical waveguides is possible, as well as open beam guidance preferably extending coaxially with respect to the replication roller 41.

The invention claimed is:

1. Apparatus for producing a marking on a substrate, wherein the marking produces a particular optical effect by having a diffractively or holographically acting surface structuring or a matt surface structuring which scatters incident light diffusely or directedly, comprising:
  a replication apparatus having a replication surface which is structured with a surface relief, wherein the surface relief is in the form of a negative for the surface structuring of the marking;
  a device for producing radiation, preferably a laser installation, which co-operates with the replication apparatus, by the radiation being directed onto at least one irradiation region of the replication apparatus for producing regions of different temperatures on the replication surface forming at least one shaping region defining the marking; and
  a counterpressure apparatus,
  wherein the substrate is arrangeable between the replication apparatus and the counterpressure apparatus in order to shape the shaping region onto the substrate in a contact region where the replication surface contacts the substrate, producing the surface structuring, and
  wherein the feed of the radiation for producing the shaping regions extends outside the substrate, and
  wherein a position of an impingement point of the radiation on the replication surface is controllable by a one-dimensional or multi-dimensional movement of the radiation and or that the power density in relation to surface area of the radiation at the impingement point of the radiation on the replication surface is controllable, and
  wherein a control sequence for actuation of the radiation-producing device is extendable over more than one operating cycle of the replication apparatus and
  wherein a chance in the selection of the shaped region is effectable by a change in the temperature distribution on the replication surface.

2. Apparatus as set forth in claim 1, wherein the Poynting vector of the radiation upon impingement on the replication apparatus does not point onto the contact region and/or that the Poynting vector of the radiation upon impingement onto the replication apparatus points onto the contact region but the radiation does not reach the substrate in the contact region.

3. Apparatus as set forth in claim 1, wherein there is provided an additional energy source which is preferably separate from the radiation-producing device.

4. Apparatus as set forth in claim 3, wherein the additional energy source is such that the temperature of the replication apparatus is adjustable at least in partial regions of the replication surface by means of the additional energy source.

5. Apparatus as set forth in claim 3, wherein the additional energy source is formed by a heating laser device and/or an inductive heating device and/or a resistance heating device and/or a device for producing heat beams.

6. Apparatus as set forth in claim 3, wherein the additional energy source is arranged within the replication apparatus.

7. Apparatus as set forth in claim 1, wherein the replication apparatus is a stamping punch or a stamping cylinder, in particular a rotating roller.

8. Apparatus as set forth in claim 7, wherein the rotating roller is of a length of between 500 mm and 2,500 mm and/or its periphery is between 500 mm and 1,500 mm.

9. Apparatus as set forth in claim 1, wherein there is provided a control device for controlling the irradiation regions, in particular a freely programmable control device, wherein it is preferably provided that the control device is adapted for actuating the radiation-producing device.

10. Apparatus as set forth in claim 1, wherein there is provided a cooling apparatus for cooling the replication surface, in particular partial regions of the replication surface, which is preferably in the form of a blower, gas flow cooling or a cooling roller.

11. Apparatus as set forth in claim 1, wherein the radiation is directed onto the replication surface of the replication apparatus so that it impinges on the replication surface.

12. Apparatus as set forth in claim 1, wherein the radiation is arranged parallel to the substrate and/or perpendicularly to the irradiation region of the replication apparatus.

13. Apparatus as set forth in claim 1, wherein the replication apparatus has an inside surface which is parallel to and/or concentric with the replication surface and the radiation is directed onto the inside surface so that the radiation impinges on the inside surface.

14. Apparatus as set forth in claim 13, wherein, arranged between the inside surface and the replication surface is or are a metal film, in particular a film of nickel or a nickel compound, and/or an absorption layer and/or a heat-conducting layer and/or a transparent layer, in particular a plate or a cylinder which are transparent in relation to the wavelength of the radiation.

15. Apparatus as set forth in claim 1, wherein the radiation producing device has a plurality of laser sources which are spaced from each other and which are in the form of a diode laser array and are individually actuatable.

16. A process for producing a marking on a substrate, wherein the marking produces a particular optical effect by having a diffractively or holographically acting surface structuring or a matt surface structuring for diffusely or directedly scattering incident light, wherein energy in the form of radiation, preferably laser radiation, from a device producing radiation is used for producing regions of different temperatures on a replication surface of a replication apparatus forming at least one shaping region defining the marking, and wherein the replication surface is structured with a surface relief, wherein the surface relief is in the form of a negative for the surface structuring of the marking, and wherein the surface relief of the replication surface is shaped onto the substrate, forming the surface structuring, by the replication apparatus contacting the substrate under pressure, and wherein the radiation for producing the shaping regions is fed outside the substrate, and wherein a position of an impingement point of the radiation on the replication surface is controllable by a one-dimensional or multi-dimensional movement of the radiation and/or that the power density in relation to surface area of the radiation at the impingement point of the radiation on the replication surface is controllable, and wherein a control sequence for actuation of the radiation-producing device extends over more than one operating cycle of the replication apparatus, and wherein a change in the selection of the shaped region is effected by a change in the temperature distribution on the replication surface.

17. A process as set forth in claim 16, wherein the replication apparatus is subjected to a temperature control effect at least in partial regions of the replication surface using an additional energy source which is preferably separate from the radiation-producing device.

18. A process as set forth in claim 17, wherein at least one heat combination region is formed on the replication surface by an energy input from the additional energy source and an energy input from the radiation-producing device.

19. A process as set forth in claim 17, wherein the shaping region is shaped, which corresponds to the heat combination region or which is complementary to the heat combination region.

20. A process as set forth in claim 17, wherein the temperature of the replication surface, which prevails during the shaping operation, is set to a plastic temperature range in at least one region outside the heat combination region by the temperature control effect operation, and that the temperature of the replication surface, which prevails during the shaping operation, is set to a flow temperature range in at least one region within the heat combination regions by the energy additionally introduced with the radiation.

21. A process as set forth in claim 20, wherein a range within +/−2% of a substrate-specific plastic temperature is used as the plastic temperature range.

22. A process as set forth in claim 19, wherein the range of 180° C. +/−2.5° C. is used as the plastic temperature range.

23. A process as set forth in claim 17, wherein the temperature of the replication surface, which prevails during the shaping operation, is set to an elastic temperature range in at least one region outside the heat combination region by the temperature control effect operation, and that the temperature of the replication surface, which prevails during the shaping operation, is set to a plastic temperature range in the region within the heat combination regions by the energy additionally introduced with the radiation.

24. A process as set forth in claim 23, wherein a range within +/−2% of a substrate-specific plastic temperature is used as the plastic temperature range.

25. A process as set forth in claim 23, wherein the range of 180° C. +/−2.5° C. is used as the plastic temperature range.

26. A process as set forth in claim 16, wherein the replication surface is subjected to a homogenous temperature control effect completely or in surface portions prior to the energy input from the radiation-producing device.

27. A process as set forth in claim 16, wherein the temperature of the replication surface is set to at least 100° C., preferably at least 170° C.

28. A process as set forth in claim 16, wherein the temperature control of the replication surface is effected by electrical heating and/or by pre-heating radiation, in particular a pre-heating laser beam.

29. A process as set forth in claim 16, wherein the replication surface is cooled completely in partial regions after the shaping operation and/or prior to a following energy input from the radiation-producing device.

30. A process as set forth in claim 16, wherein the radiation is directed onto the replication surface of the replication apparatus and/or that the radiation is introduced onto a surface remote from the replication surface.

31. A process as set forth in claim 16, wherein the radiation is introduced into the replication apparatus before and/or while the heat combination region resulting therefrom is in contact with the substrate.

32. A process as set forth in claim 16, wherein a replication roller is used as replication apparatus and that the introduction of radiation into the replication roller is effected at a first angular position of the replication roller and the contact of the replication roller with the substrate is effected at a second angular position of the replication roller, wherein an intermediate angle which is different from 0°, preferably less than 180°, in particular less than 90°, is set between the first angular position and the second angular position in the direction of rotation of the replication roller.

33. A process as set forth in claim 16, wherein the radiation acts on the replication apparatus over an area and/or in point form sequentially.

34. A process as set forth in claim 16, wherein the radiation-producing device has a plurality of laser sources which are preferably spaced from each other and which in particular are in the form of a diode laser array and in particular are individually actuatable.

35. A process as set forth in claim 16, wherein the control sequence extends over more than a revolution of the replication roller or a stroke of the stamping punch.

36. A process as set forth in claim 16, wherein the energy input from the radiation-producing device is introduced in the heat combination region by direct absorption and/or heat conduction.

37. A process as set forth in claim 16, wherein an apparatus as set forth in claim 1 is used.

38. A method for forming a light scattering marking on a substrate comprising the steps of:
irradiating a region of a replication surface with laser energy, whereby said irradiated region has a temperature greater than a non-irradiated region of said replication surface, at least one of said irradiated region and said non-irradiated region having a stamping structure;
pressing said replication surface on the substrate whereby said stamping structure thermally deforms the substrate to form the light scattering marking, wherein the marking has boundaries defined by said irradiated and non-irradiated regions of said replication surface.

* * * * *